United States Patent
Beitler et al.

[11] Patent Number: 6,029,792
[45] Date of Patent: Feb. 29, 2000

[54] FRICTION CLUTCH WITH SPRING COMPENSATING THE CHANGE IN PRESSURE FORCE DUE TO WEAR

[75] Inventors: Hubert Beitler, Kornwestheim; Ernst Tscheplak, Österreich, both of Germany

[73] Assignee: Daimler-Benz Atiengesellschaft, Stuttgart, Germany

[21] Appl. No.: 09/137,787

[22] Filed: Aug. 21, 1998

[30] Foreign Application Priority Data

Aug. 22, 1997 [DE] Germany ............ 197 36 557

[51] Int. Cl.⁷ .................................. F16D 13/71
[52] U.S. Cl. .................. 192/111 A; 192/70.25; 192/98
[58] Field of Search ............ 192/70.27, 111 A, 192/110 B, 98, 89.23, 109 A, 70.25

[56] References Cited

U.S. PATENT DOCUMENTS

| | | | |
|---|---|---|---|
| 3,376,964 | 4/1968 | Root ............................. | 192/111 A |
| 3,876,049 | 4/1975 | Linn et al. ..................... | 192/111 A |
| 4,057,134 | 11/1977 | Gatewood ..................... | 192/111 A |
| 4,109,773 | 8/1978 | Higgerson et al. ............ | 192/111 A |
| 4,579,203 | 4/1986 | Link ............................. | 192/111 A X |
| 4,702,361 | 10/1987 | Banks ........................... | 192/111 A X |
| 5,088,584 | 2/1992 | Inaba et al. ................... | 192/70.27 X |

FOREIGN PATENT DOCUMENTS

| | | |
|---|---|---|
| 2313597 | 12/1976 | France . |
| 27 58 365 | 6/1978 | Germany . |
| 33 13 750 | 11/1983 | Germany . |
| 32 29 052 | 2/1984 | Germany . |
| 35 16 152 | 6/1986 | Germany . |
| 38 06 642 | 9/1989 | Germany . |
| 41 32 349 | 4/1992 | Germany . |
| 42 39 289 | 4/1992 | Germany . |
| 39 91 022 | 5/1993 | Germany . |
| 42 39 289 | 5/1993 | Germany . |
| 195 35 712 | 10/1996 | Germany . |
| 2261922 | 6/1993 | United Kingdom . |

Primary Examiner—Richard M. Lorence
Assistant Examiner—Ankur Parekh
Attorney, Agent, or Firm—Kenyon & Kenyon

[57] ABSTRACT

A friction clutch whereby the operating force characteristic is made largely independent of the wear of the clutch disk. The friction clutch is characterized in that in the engaged position of the clutch, the initial position of a clutch plate corresponding to an initial thickness of the clutch disk corresponds to a stop position of a spring in the direction of a displacement of a pressure plate against the clutch disk, from which the spring produces the superimposed elastic force when the pressure plate is displaced in the direction of clutch disk.

19 Claims, 3 Drawing Sheets

FRICTION CLUTCH WITH SPRING COMPENSATING THE CHANGE IN PRESSURE FORCE DUE TO WEAR

FIELD OF THE INVENTION

The present invention relates to a friction clutch, and more particularly to a friction clutch for motor vehicles.

RELATED TECHNOLOGY

German Patent Application No. 4239289 A1 discloses a friction clutch in which a pressure plate is fixed in relation to the clutch housing in the direction of rotation by spring leaves, the spring leaves extending circumferentially, i.e., tangentially to the pressure plate. The spring leaves are additionally axially pre-tensioned by the clutch disk for the purpose of lifting the pressure plate off from the clutch plate, thus against the pressure force exerted by the diaphragm spring on the pressure plate so that the activating force to be applied for disengagement of the clutch is reduced by the spring leaves. This is used with a readjusting device via which the pivot point of the diaphragm spring between its radial outside contact on the pressure plate and its radial inside support against the clutch release bearing is shifted in an axial direction in dependence on wear, i.e., in the axial direction of the clutch. The spring characteristic of the diaphragm spring thus is largely preserved since the axial distance between the pivot point of the diaphragm spring and the pressure plate is essentially constant, regardless of possible wear of the clutch disk. The relatively small changes which occur with the wear-dependent readjustment of the pivot point in the axial distance between the pivot point and the contact of the diaphragm spring on the clutch release bearing can be compensated via the leaf springs without their dynamic effect directed against the pressure force of the diaphragm spring interfering with the function of the clutch.

SUMMARY OF THE INVENTION

The present invention seeks to make it possible to compensate for changes of the pressure force of a diaphragm spring occurring as a function of the wear of the clutch disk. The present invention functions without the use of a readjusting device for the pivot point of the diaphragm spring as a function of the wear of the clutch disk, thereby providing a simple clutch structure.

The present invention provides a friction clutch, for motor vehicles in particular, having a clutch disk, which can be clamped between two bearing surfaces and whose thickness is wear-dependent, and a pressure plate assigned to one of the bearing surfaces. The pressure plate is axially displaceable and non-rotatably arranged in a clutch housing, the pressure plate being capable of having force applied to it by a diaphragm spring arranged between the clutch housing and the pressure plate, the pressure force of the diaphragm against the pressure plate being variable over the axial travel of the pressure plate and having an initial value given by the engaged position of the clutch corresponding to the initial thickness of the clutch disk, in relation to which a wear-dependent value is obtained, dependent on the wear of the clutch disk. The deviation of the wear-dependent value from the initial value is at least partially compensable by the use of a spring producing a superimposed elastic force. The clutch is characterized in that in the engaged position of the clutch (2), the initial position of the clutch plate (8) corresponding to the initial thickness of clutch disk (6) corresponds to a stop position of the spring (28) in the direction of a displacement of pressure plate (8) against the clutch disk (6), from which the spring (28) produces the superimposed elastic force when the pressure plate (8) is displaced in the direction of clutch disk (6).

The wear-related changes in the pressure force of the pressure plate—in terms of an increase of the pressure force—are compensated, even without a readjusting device, by the superimposed counteracting force which comes into effect starting from the initial position of the pressure plate corresponding to the initial thickness of the clutch disk. In the device according to the present invention, the springs acting against the pressure force of the pressure plate take effect only when wear-related deviations from the designed initial position occur so that the functional characteristics of the clutch are preserved independently of wear and also in relation to the activation force to be applied to release the clutch. Depending on the type of springs and in consideration of the changes in the form of the pressure force which take place as a function of wear, it may be expedient to design and select the springs so that they are nearly without pre-tension in their stop position or already have a pre-tension. However, even if the springs are pre-tensioned, this does not have an effect on the release force to be applied for operation of the clutch or on the pressure force of the diaphragm spring against the pressure plate, since the elastic force of the spring is only applied when a displacement of the pressure plate occurs due to wear.

Such a device can be implemented in a particularly simple manner if the spring applying the superimposed elastic force is contained in the release device provided for the operation of the clutch.

For this purpose, the release device can include a release bearing guided axially displaceably in the known manner, the release bearing being axially displaceable against the spring from its initial position as a setting position corresponding to the initial thickness of the clutch plate as a function of the wear of the clutch plate so that the spring, acting as a stop and which is also limited by a stop in its extension in the direction of the release bearing, can only operate if there is wear. In the device according to the present invention, the initial position of the release bearing thus corresponds with the stop position of the spring.

When clutch disks are used, which for their part contain lining springs in the known manner, a spreading force operates against the pressure force of the pressure plate. In these disks when the clutch is engaged, the contact force of the diaphragm spring either compresses the lining springs of the clutch disk en bloc or is in equilibrium with the spreading force of the lining springs, so that it is possible for the design point—an engaged clutch—to be practically preserved. This point is preferably located in the known manner such that the spreading force of the lining springs is in equilibrium with the contact force of the pressure plate so that with the compensation of wear-dependent deviations, i.e., dependent on the wear of the clutch disks, occurring in the pressure force of the diaphragm spring on the clutch disk, the equilibrium between the spreading force of the lining springs and the pressure force is preserved; consequently, the characteristics of the pressure force, and in a corresponding manner, the operating force of the clutch, remain the same regardless of wear.

The present invention makes it possible to preserve the wear-independent operating characteristics of a clutch to a great extent in a simple clutch design.

BRIEF DESCRIPTION OF THE DRAWINGS

The present invention will be explained in greater detail below with reference to drawings in which.

DETAILED DESCRIPTION

Figure 1:
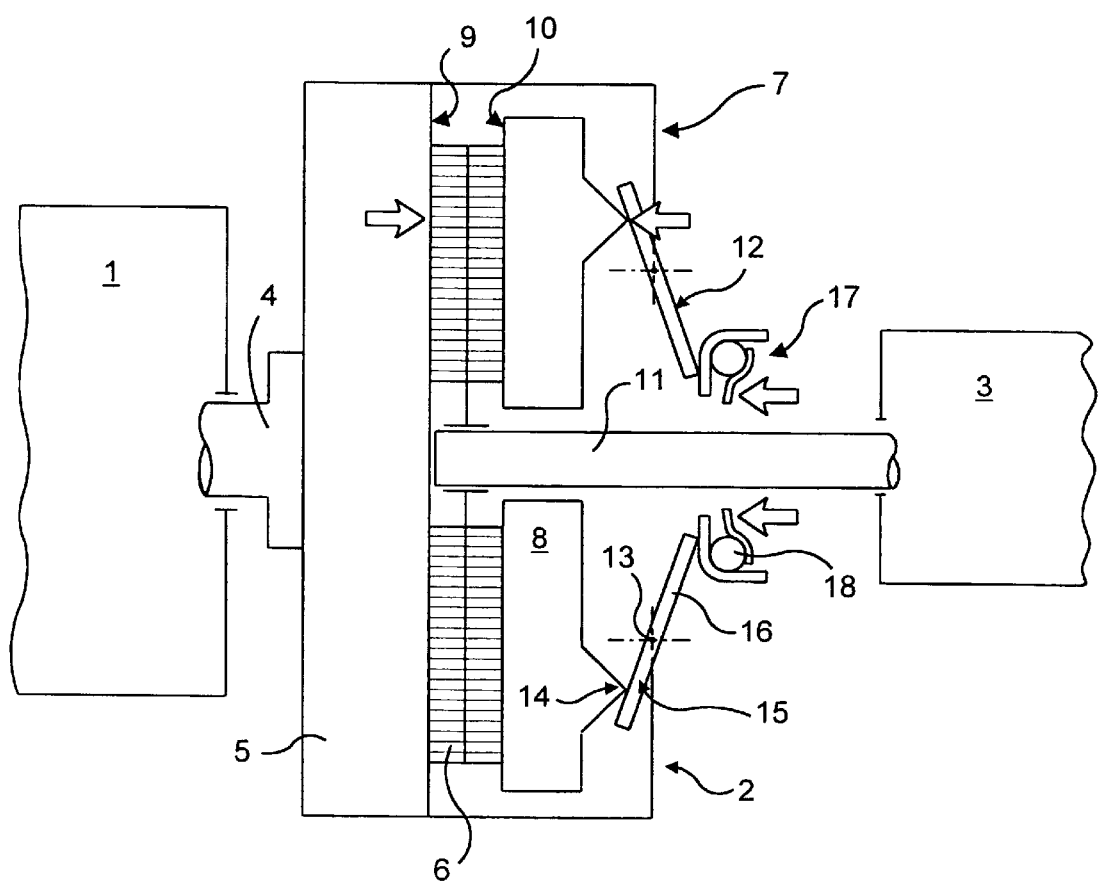
FIG. 1 shows a schematic representation of a clutch for motor vehicles.

FIG. 1 shows, in a highly diagrammatic form, the parts of a drive train of a motor vehicle, specifically engine 1 and transmission 3 connected to engine 1 via a clutch 2. A drive leads from the transmission to the wheels of the vehicle.

Figure 2:
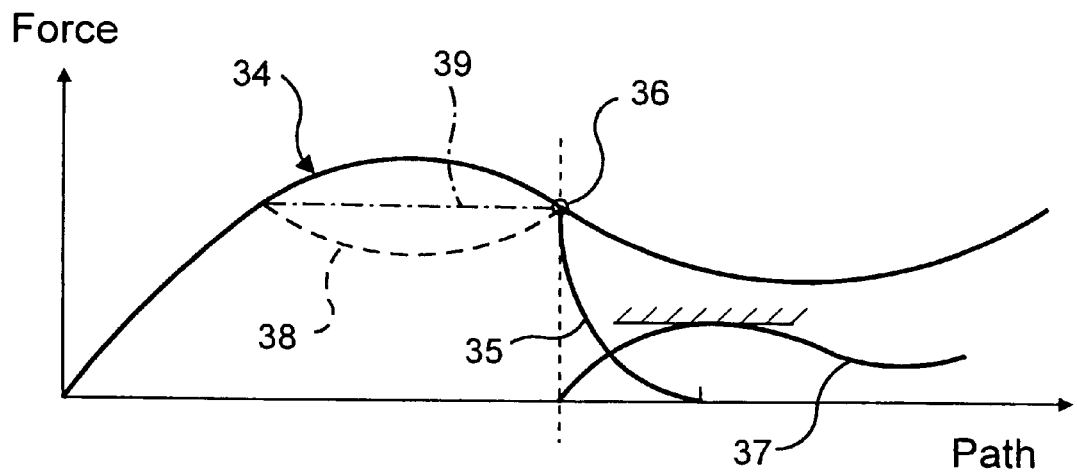
FIG. 2 shows the pressure force between the pressure plate and the clutch disk on the one hand and the required release force on the other hand in a force-path diagram in a basic representation.
Figure 3:
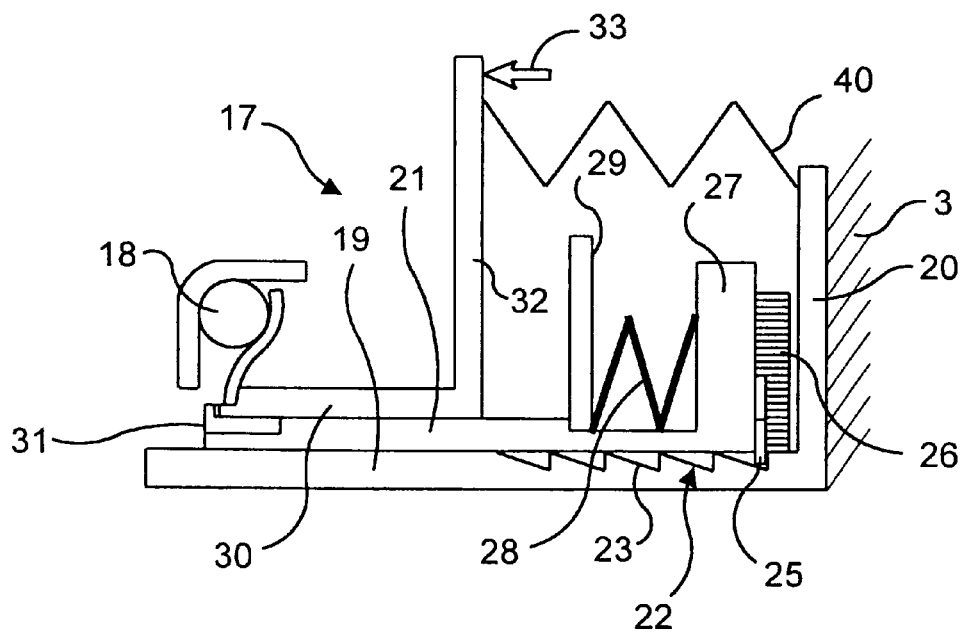
FIG. 3 shows a release device according to the present invention in a schematic representation.

The crankshaft of engine 1 is designated 4 and is non-rotatably joined to a flywheel 5 which at the same time forms a component of clutch 2 whose clutch disk 6 is located between flywheel 5 and a pressure plate 8 which is non-rotatably joined to the flywheel via clutch housing 7. Flywheel 5 and pressure plate 8 form bearing surfaces 9 and 10 for clutch disk 6 which in turn is centrally, non-rotatably attached to a shaft 11, usually the transmission input shaft, leading to transmission 3. Force can be applied to pressure plate 8 via a diaphragm spring 12 which itself is pivotably supported against clutch housing 7 in a ring zone 13. Radially, ring zone 13 is positioned on a smaller diameter than the similarly annular support 14 between diaphragm spring 12 and pressure plate 8, the pressure force of diaphragm spring 12 against clutch disk 6 in ring zone 15 between supports 13 and 14 being variable by changing its conicity. This will be explained in greater detail with reference to FIG. 2. Ring area 16 of the diaphragm spring, which is located radially inward, radially within the pivoting support of diaphragm spring 12 against clutch housing 7 taking place in ring zone 13, is customarily formed by fingers extending in a radial direction to which force can be applied in their radially inward end area with release bearing 18 via release device 17. As shown in FIG. 3, release device 17 is non-rotatably supported in relation to transmission 3, the transition between fixed release device 17 and clutch 2 rotating with crankshaft 4 taking place via release bearing 18.

In its basic representation according to FIG. 3, release device 17 has a support pipe 19 which is located concentrically in relation to shaft 11 and surrounds it, specifically with axial support against a fixed part of the vehicle, particularly against transmission 3. A tolerance compensation pipe 21 is guided longitudinally displaceably on support pipe 19 which is, for instance, attached to transmission 3 via a flange 20, tolerance compensation pipe 21 being capable of being locked in position via a ratchet-like snap-in connection 22. In the exemplary embodiment, this snap-in connection 22, corresponding to the outer circumference of support pipe 19, has a sawtooth profile 23 which interacts with a snap element provided on tolerance compensation pipe 21, the snap element here being in the form of a snap ring 25 which is associated with a holding device 26. Holding device 26 is attached to the transmission-side end of tolerance compensation pipe 21, on which end tolerance compensation pipe 21 has a shoulder 27 against which a spring 28 is supported. Spring 28 is supported on its other side against a stop 29 as a compensation spring which is supported against tolerance compensation pipe 21 and is formed as a ring plate which is supported on a step-like offset of tolerance compensation pipe 21. In addition, a release bearing pipe 30 is guided on tolerance compensation pipe 21, it also being axially displaceable, the release bearing pipe supporting release bearing 18 on its end which is distal to transmission 3 and facing the clutch, its path of displacement in the direction of the clutch being limited by a stop 31. In the opposite direction, the end of release bearing 30 is equipped with a shoulder 32 against which a return spring 40 braced between flange 20 and shoulder 32 is supported, via which, release bearing 18 is held in contact with diaphragm spring 12. Symbolically, arrow 33 shows that the clutch actuation, which is not further shown, acts on release bearing pipe 30 via a corresponding adjuster and that the operating force to be initiated in it for operation of the clutch is applied to release bearing pipe 30.

In the engaged state of the clutch shown in FIG. 1, clutch disk 6 is clamped between bearing surfaces 9 and 10 of flywheel 5 and pressure plate 8, the pressure force originating from pressure plate 8 being applied via diaphragm spring 12. In FIG. 2, this pressure force applied by diaphragm spring 12 is schematically shown in a force-path diagram and designated as 34. As the friction element located between flywheel 5 and pressure plate 8, clutch disk 6 is equipped with corresponding friction linings and thus subjected to a certain wear, which in practical use, leads to a wear-related reduction of the thickness of clutch disk 6. It is not shown in the exemplary embodiments that clutch disk 6 is also customarily designed to be spring-loaded in an axial direction which is brought about by the lining springs which force apart the friction linings of clutch disk 6 in the sense of a spreading and which, when the clutch is engaged, if they are not compressed en bloc by the pressure force of the diaphragm spring, are in a state of equilibrium with this pressure force 34, the mentioned lining spring force as a spreading force being designated as 35 in the representation according to FIG. 2. The point of intersection of pressure force 34 and lining spring force 35 determines the operating point of a new clutch, i.e., one that has not been subjected to wear. Starting from this operating point, the operation of the clutch results in a curve of the operating force for the clutch according to line 37 in FIG. 2.

As FIG. 2 shows, the position of operating point 36 is located so that pressure force 34 which corresponds to the diaphragm spring force increases with decreasing thickness of clutch disk 6, i.e., as a function of wear. Such a wear-dependent increase is undesirable because, among other things, it changes the operating characteristic by making clutch operation more difficult, which is also undesirable for reasons of comfort. Therefore, according to the present invention, an opposing spring force, dependent on wear, is superimposed on pressure force 34 of the diaphragm spring, the opposing spring force being applied by compensation spring 28 and is illustrated as a compensation spring force in FIG. 2 by line 38. With complete compensation, line 38 is a mirror image of pressure force 34, with reference to a plane of symmetry 39 passing through operating point 36 parallel to the abscissa, so that when there is clutch wear, operating point 36 and consequently the pressure force are unchanged due to the action of compensation spring 28. Accordingly, the operating force for the clutch, symbolized by line 37 is also unchanged so that clutch wear has no effect on the characteristic of the operating force.

With reference to the release device according to FIG. 3, FIGS. 4, 5, 6, 7 and 8 show the interaction of the release device with the clutch, the previous drawing references being used in the following description of these embodiments.

Figure 4:
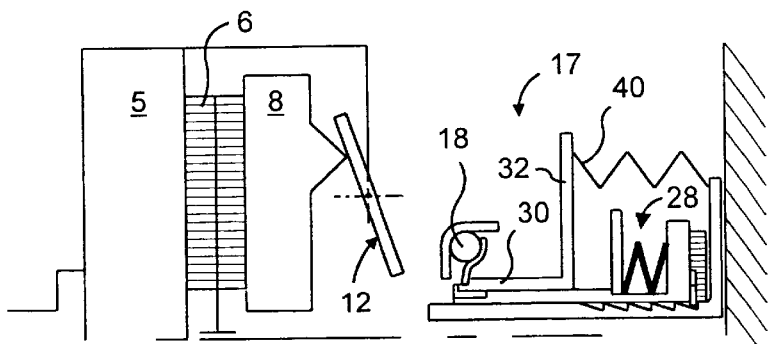
FIGS. 4, 5, 6, 7 and 8 show various operating positions of the clutch and release device in schematic representations.

The starting point is FIG. 4 in which clutch 2, release device 17 and symbolically shown transmission 3 are assembled with engine 1; however, an adjustment of clutch 2, i.e., a tolerance compensation, has not yet taken place.

Figure 5:
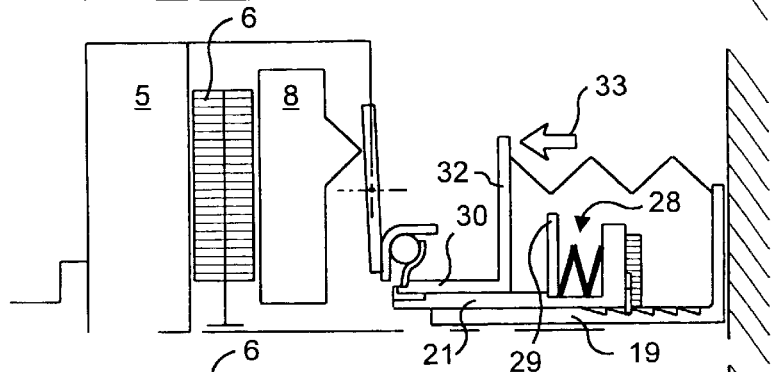
Figure 6:
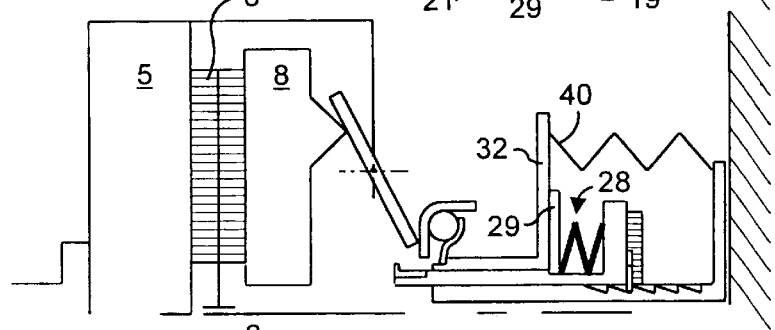

As illustrated in FIG. 5, this tolerance compensation takes place with the initial operation of release device 17 in which release bearing pipe 30 is initially displaced in relation to tolerance compensation pipe 21 up to stop 31 via operating force 33 exerted on release bearing pipe 30, and then together with tolerance compensation pipe 21 further until the clutch is released by pressure plate 8 lifting off from clutch disk 6. The position of tolerance compensation pipe 21 reached with the clutch disengaged in relation to support pipe 19 is fixed via the engagement of snap ring 25 into sawtooth profile 23, sawtooth profile 23 being formed so that a displacement in the opposite direction, i.e., in the direction of transmission 3 is not possible. The position reached and fixed in this manner for tolerance compensation pipe 21 corresponds to the position of the release device in which the engaged clutch (FIG. 6) assumes an initial position corresponding to operating point 36 in FIG. 2. Starting from this engaged position of a new clutch (FIG. 6), it is illustrated in FIG. 7 how the situation changes with wear of clutch disk 6.

Figure 7:
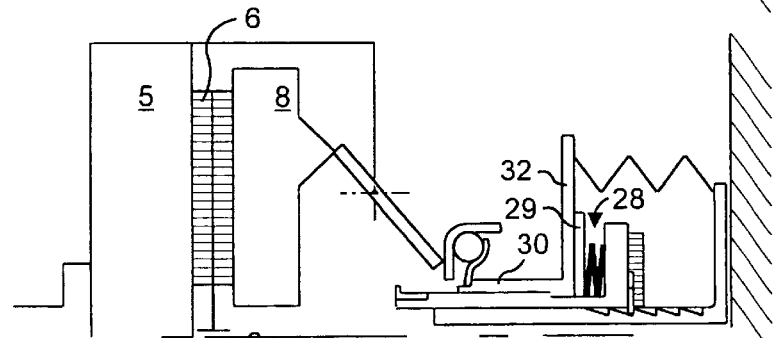
Figure 8:
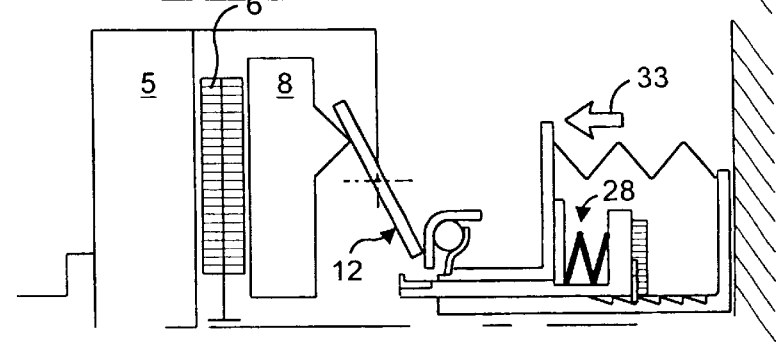

Based on the extreme wear situation shown in FIG. 7, it is evident that diaphragm spring 12—comparable to a lever—assumes a flatter pivot position. In other words, it now forms a cone with steeper conicity as a result of the enlargement of the axial distance between annular support 14 against the pressure plate and the support in ring zone 13 on the housing side, resulting in the cone having a higher pressure force as explained with the aid of FIG. 2. This increase in pressure force is compensated by the compression of compensation spring 28 which results from the fact that the stronger conicity of the diaphragm spring with a correspondingly greater axial length of ring area 16 results in a displacement of release bearing pipe 30 in the direction of transmission 3 and into the compensation range of spring 28, the spring relaxing parallel to operating force 33 when the clutch is released as shown in FIG. 8, and thus in a reversal of the process according to FIG. 7, compensating for the wear-related increase in the elastic pressure force when the clutch is released.

If compensation spring 28 is pre-tensioned, stop 29 limits the spring travel by elongating spring 28 on the one hand and serves as a stop and support for release bearing pipe 30. However, spring 28 can, if it is not pre-tensioned, also serve directly as a stop and bearing surface for shoulder 32 of release bearing pipe 30.

The integration of the compensation into the release device according to the present invention leads to a very simple overall design which is easy to handle.

What is claimed is:

1. A friction clutch comprising:
    a clutch disk for clamping between two bearing surfaces and having a wear-dependent thickness including an initial thickness;
    a pressure plate assigned to one of said two bearing surfaces, the pressure plate being axially displaceable and non-rotatably arranged in a clutch housing, the pressure plate capable of receiving a pressure force applied by a diaphragm spring arranged between the clutch housing and the pressure plate, the pressure force being variable over an axial travel of the pressure plate and having an initial value given by an initial engaged position corresponding to said initial thickness of the clutch disk, a wear-dependent value of the pressure force varying from the initial value as a function of wear on the clutch disk;
    an axially guided release bearing for operating the clutch, and
    a compensation spring for at least partially influencing the wear-dependent value of the pressure force through a superimposed elastic force transmitted via the release bearing;
    the pressure plate in said initial engaged position corresponding to a stop position of the compensation spring, the stop position corresponding to a maximum relaxation of the compensation spring in a direction of a displacement of the pressure plate against the clutch disk, the compensation spring, producing from the stop position the superimposed elastic force when the pressure plate is displaced toward the clutch disk.

2. The friction clutch as recited in claim 1 wherein the compensation spring is not pretensioned in the stop position.

3. The friction clutch as recited in claim 1 wherein the compensation spring is pretensioned in the stop position.

4. The friction clutch as recited in claim 3 further comprising a stop for supporting the compensation spring thereagainst.

5. The friction clutch as recited in claim 1 wherein the compensation spring starting from the stop position has a force-path curve corresponding to a mirror image of the wear dependent value of the pressure force over a wear path.

6. The friction clutch as recited in claim 1 further comprising a release device for operating the clutch, the release device applying a force on the diaphragm spring, the release device including the compensation spring.

7. The friction clutch as recited in claim 6 wherein the release device includes the release bearing, the release bearing being axially displaceable against the compensation spring as a function of the wear of the clutch disk in a release bearing initial position corresponding to the initial thickness of the clutch disk and forming a setting position.

8. The friction clutch as recited in claim 7 wherein the release bearing initial position corresponds to the stop position.

9. The friction clutch as recited in claim 8 further comprising an axially displaceable release bearing pipe connected to the release bearing.

10. The friction clutch as recited in claim 9 wherein the release bearing pipe is capable of receiving a release actuation force to disengage the clutch.

11. The friction clutch as recited in claim 9 further comprising a stop for limiting an extension of the compensation spring the stop being displaceable together with the compensation spring against a spring elastic force so as to form a support for the release bearing pipe.

12. The friction clutch as recited in claim 11 further comprising a guide for carrying the compensation spring, the release bearing pipe being axially displaceable on the guide.

13. The friction clutch as recited in claim 12 wherein the guide carrying the compensation spring and the release bearing pipe is a tolerance compensation pipe.

14. The friction clutch as recited in claim 13 further comprising a support pipe, the tolerance compensation pipe being guided on the support pipe.

15. The friction clutch as recited in claim 14 wherein the support pipe is adapted to be located coaxially to an input shaft of a transmission associated with the clutch.

16. The friction clutch as recited in claim 14 wherein the tolerance compensation pipe is axially displaceable on the support pipe.

17. The friction clutch as recited in claim 14 further comprising a ratchet-type locking device, the tolerance compensation pipe lockable to the support pipe against displacement in one direction by the ratchet-type locking device.

18. The friction clutch as recited in claim 17 wherein the ratchet-type locking device blocks travel of the tolerance compensation pipe in a direction of a transmission-side support of the support pipe distal to the release bearing.

19. The friction clutch as recited in claim 1 wherein the friction clutch is a motor vehicle friction clutch.

\* \* \* \* \*